United States Patent [19]
Coombs et al.

[11] Patent Number: 5,419,937
[45] Date of Patent: May 30, 1995

[54] OPTICAL RECORD CARRIER

[75] Inventors: James H. Coombs, Eindhoven, Netherlands; Antonius H. M. Holtslag, Croton on Hudson, N.Y.; Wilma Van Es Spiekman, Eindhoven, Netherlands

[73] Assignee: U.S. Philips Corporation, New York, N.Y.

[21] Appl. No.: 3,085

[22] Filed: Jan. 11, 1993

Related U.S. Application Data

[63] Continuation-in-part of Ser. No. 955,085, Oct. 1, 1992, abandoned.

[30] Foreign Application Priority Data

Dec. 12, 1991 [EP] European Pat. Off. ............ 91203265

[51] Int. Cl.$^6$ ................................................ B32B 3/00
[52] U.S. Cl. ........................................ 428/64; 428/65; 428/457; 428/913; 346/135.1; 347/264
[58] Field of Search ................... 428/64, 65, 457, 913; 346/76 L, 135.1; 369/28

[56] References Cited

U.S. PATENT DOCUMENTS

| | | | |
|---|---|---|---|
| 4,984,231 | 1/1991 | Yammoka | 369/275.1 |
| 5,147,701 | 9/1992 | Furukawa et al. | 428/64 |
| 5,208,088 | 5/1993 | Tominga et al. | 428/64 |

FOREIGN PATENT DOCUMENTS 0352105  1/1990  European Pat. Off. .
2158932  6/1990  Japan .

Primary Examiner—Patrick J. Ryan
Assistant Examiner—Elizabeth Evans
Attorney, Agent, or Firm—Leroy Eason

[57] ABSTRACT

An optical record carrier with a substrate (1) having thereon a stack (3) of a reflection layer (4), an interference layer (5) and a phase-change recording-layer (6) in that order, the incident radiation being first incident on the reflection layer. Due to this structure of the stack a high contrast between the inscribed and uninscribed areas of the recording layer, and/or a high reflection, is obtained.

17 Claims, 3 Drawing Sheets

OPTICAL RECORD CARRIER

Related Applications

This application is a continuation-in-part of Application Ser. No. 07/955,085, filed Oct. 1, 1992, by the present Applicants.

BACKGROUND OF THE INVENTION

Field of the Invention

The invention relates to an optical record carrier for writing and reading information by means of a radiation beam incident on an entrance face of the record carrier, comprising a substrate carrying a stack of layers, which stack comprises a recording layer, an interference layer and a reflection layer, in that order. An interference layer is a layer giving rise to optical interference effects.

3. Description of the Related Art

Many known optical record carriers such as the Compact Disc (CD), Compact Disc Read Only Memory (CD-ROM) and Laser Vision (LV) are prerecorded by the manufacturer and can only be read by the user. Another type of record carrier, which is inscribable by means of a special write/read device and is also readable with the same read device as the one with which the aforesaid uninscribable record carriers are read, is also in general use. Examples are distribution of information in the form of audio or digital data to a small number of clients, for which the manufacture of a normal CD or CD-ROM is too expensive. However, for readability, the inscribed record carrier must satisfy the same standard requirements as the non-inscribable record carrier. This calls for an initial reflection of 70% or more and a contrast of 60% for the CD. The initial reflection is the reflection of an uninscribed part of the record carrier, while the contrast is the difference in reflection of the non-inscribed parts and the inscribed parts, divided by the initial reflection. It is found to be difficult to manufacture an inscribable record carrier which meets these requirements. This is particularly the case if materials referred to as phase-change materials are used for the recording layer. The crystal phase of these materials changes in response to irradiation with a laser beam, so that the reflection of the material changes. However, the known phase-change materials have too low reflection to be used without any difficulty in a record carrier which is compatible with the normal CD.

An inscribable record carrier of the type described above is known from European Patent Application No. 0 352 105. This record carrier comprises a substrate with the entrance face on one side and on the other side first a recording layer, subsequently an interference layer and finally a reflection layer. The radiation beam incident through the substrate is first incident on the recording layer and subsequently on the interference and reflection layers. In other words, the recording layer of the stack faces the entrance face. This stack increases the initial reflection as well as the contrast of the record carrier due to interference effects in the layers. The preferred embodiment of the record carrier described in said Patent Application has a recording layer of the phase-change material InSb; the record carrier has a reflection of 72% and 38% for the uninscribed and inscribed parts, respectively, hence a contrast of 47%.

A drawback of such known record carrier is that the structure of the stack leads to a reasonable increase of the reflection and the contrast for only a few recording materials. Other recording materials, having better write or erase properties, do not yield the desired high reflection and contrast with this stack. Increased contrast is not only desirable for a record carrier in order to meet the requirements of an industrial standard, but also for obtaining a higher signal-to-noise ratio so that the record carrier will be better readable.

SUMMARY OF THE INVENTION

It is an object of the present invention to provide a record carrier of the type described in the opening paragraph in which a large number of different types of recording layers can be used, and which has a sufficiently high reflection as well as a sufficiently high contrast. The invention provides two novel classes of record carriers each having specific embodiments.

The record carrier of the first class is characterized in that the reflection layer of the stack faces the entrance face, and in that the reflection layer comprises a metal or a metal alloy. If the incident radiation is first incident on the reflection layer and then on the recording layer via the interference layer, a higher reflection and/or higher contrast of the record carrier can be achieved, dependent on the embodiment, as compared with the known record carrier.

An embodiment of this record carrier is characterized in that the transmission coefficient of the reflection layer is larger than 0.2, and has a higher contrast.

In a further embodiment of the record carrier according to the invention the metal layer is grown on a base layer of a dielectric inorganic material. It has turned out that such a base layer allows growing of very thin metal layers with a constant thickness.

The record carrier of the second class is also characterized in that the reflection layer of the stack faces the entrance face, and further in that the reflection layer comprises at least three dielectric layers. This stack structure simultaneously provides a high reflection and a high contrast because the reflection layer does not absorb radiation.

A preferred embodiment of each of the two classes of the record carrier is characterized in that a further interference layer and a further reflection layer are provided on the recording layer on the side opposite the first interference layer. Both the reflection and the contrast are increased by adding the extra layers.

The further reflection layer is preferably a metal layer so that a minimum possible quantity of radiation is passed by the further reflection layer and consequently a maximum possible quantity of radiation is utilized for reading, while the record carrier has a maximal reflection. Such a single reflection layer can be provided easily.

The stack structure according to the invention is eminently suitable for realizing a record carrier having a high reflection and a high contrast, and in which the recording layer comprises a phase-change material.

This recording layer material preferably comprises a compound of Ge and Te. An advantage of this material is that it is satisfactorily inscribable and has a high reflection and a high contrast.

The reflection layer may use $Ta_2O_5$, which has the advantages that the reflection layer can be provided rapidly and at low cost by means of sputtering, the material has a high refractive index and the material has a low coefficient of thermal conductivity. Due to the last-mentioned property a relative low power is adequate to inscribe the recording layer.

If the record carrier is further characterized in that an anti-reflection coating is provided on the entrance face, reflection losses will no longer occur on the entrance face. As a result, the stack may have a lower reflection than that for a record carrier without an anti-reflection coating, while the record carrier as a whole still has the desired high reflection. This allowed lower reflection of the stack provides the possibility of using low-reflection but satisfactorily inscribable phase-change materials as a recording layer, which materials have hitherto been deemed unusable.

BRIEF DESCRIPTION OF THE DRAWINGS

The invention will now be described with reference to the drawings in which.

DESCRIPTION OF THE PREFERRED EMBODIMENTS

Figure 1:
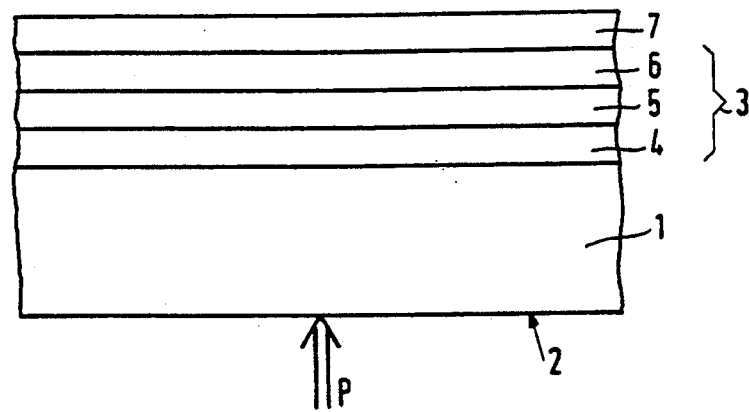
FIG. 1 shows a record carrier in accordance with the first embodiment of the invention.

FIG. 1 is a cross-section of an optical record carrier according to the invention. The record carrier has a substrate 1 which may be made of, for example, a sheet of plastic or glass. A radiation beam, generated in an optical scanning apparatus as described in, for example U.S. Pat. No. 3,376,842 (PHN 6.296) with which the record carrier can be written and/or read, enters the substrate through an entrance face 2 of the record carrier. This beam is diagrammatically illustrated by means of an arrow p in the Figure. A stack 3 comprising a reflection layer 4, a transparent interference layer 5 and a recording layer 6 is provided on the substrate and opposite the entrance face. At the other side of the stack the record carrier may be coated with a protective coating 7 which may be made of an organic material. The information is or has been laid down in the recording layer in the form of information areas which are optically distinguished from their surroundings. These areas may have, for example, a different refractive index and hence a different reflection coefficient than their surroundings.

The reflection layer 4 will reflect a portion of the incident radiation. The reflection coefficient of the reflection layer determines the reflection coefficient of the entire record carrier to a considerable extent. The radiation passed by the reflection layer is incident on the recording layer 6 via the interference layer 5. The radiation beams which are reflected at the transitions between the interference layer 5, the recording layer 6 and the protective coating 7 will interfere constructively or destructively, dependent on the thicknesses and the refractive indices of the layers. A part of the radiation reflected by the recording layer will be reflected back to the recording layer by the transition between the interference layer 5 and the reflection layer 4. This radiation will in turn interfere with the radiation passed by the reflection layer 4. This double interference produces an the amplification of the optical effect caused by the areas to be read. By suitable choice of the thickness and refractive indices of the layers in the stack 3 it is possible to give the reflection of the total record carrier as well as the optical contrast of the in formation areas the desired value. It is also possible to reverse the contrast of the areas, i.e. if an area in a recording layer without any adjacent layers has a lower reflection than its surroundings, the reflection of this area can be increased with respect to its surroundings by providing the adjacent layers. Such a reversal of contrast provides the possibility of using materials for the recording layer which have hitherto been unusable because it was impossible to satisfy given standard system requirements.

The stack according to the invention can be eminently used in inscribable record carriers in which the recording layer is a phase-change material. In such materials the crystal phase can be changed by heating with radiation and subsequent cooling. For example, it is possible to change a crystalline phase into an amorphous phase, or conversely. Due to the different optical properties of the phases it is possible to detect the areas changed in crystal phase by means of a radiation beam. The advantage of the stack according to the invention, comprising a phase-change material, will be elucidated with reference to a record carrier having a GeTe alloy which is particularly suitable as a recording material.

The uninscribed GeTe recording layer 6 is in the amorphous state in this first example, while inscribing with radiation renders an area of the recording layer crystalline. The thickness of the recording layer is optimized to obtain a high reflection in the crystalline state and a high contrast. The reflection of the two states of such a recording layer provided directly on a substrate is 28% and 56% for the amorphous and the crystalline state, respectively. The GeTe recording layer could be embedded in a stack having the structure which is known from said European Patent Application No. 0 352 105, comprising a $Ta_2O_5$ interference layer and an Au reflection layer. The gold layer in that stack has a thickness of 100 nm and so that it does not transmit any radiation. After optimization of the thickness of layers, the reflections would be 26% and 58%. When the layers are optimized, it should be taken into account that the radiation for which optimization takes place does not form a parallel but a focused beam. Such an optimization is known, inter alia, from Japanese Patent Application No. 2-158932.

According to the invention, the GeTe recording layer is embedded in a stack which is the reverse of the known stack. After optimization, the stack according to the invention, as shown in FIG. 1, has an Au reflection layer 4 with a thickness of 19 nm, a $Ta_2O_5$ interference layer 5 with a thickness of 184 nm and a recording layer 6 with a thickness of 23 nm. The reflection of the record carrier is then 28% and 71% for an amorphous and a crystalline area, respectively. In spite of the simple structure of the stack, the record carrier satisfies the stringent requirements which are mentioned in the opening paragraph and are imposed on CD media.

Figure 2:
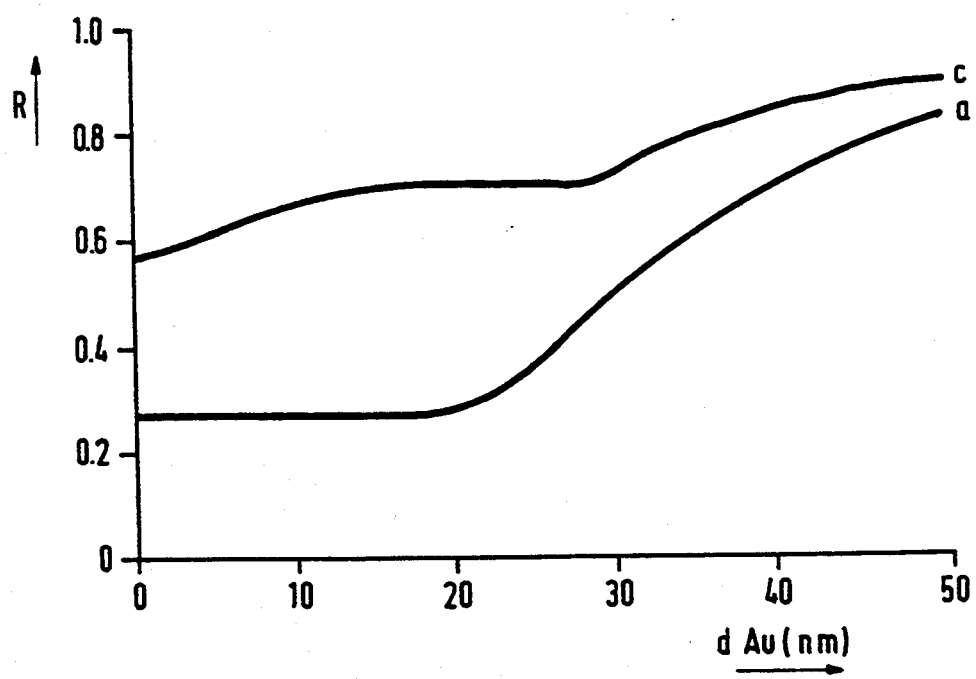
FIG. 2 shows the reflection of the record carrier of FIG. 1 as a function of the thickness of the reflection layer.

The effect of the reflection layer on the optical properties of the record carrier comprising a stack according to the invention is readily evident from FIG. 2. This Figure shows the reflection R of a record carrier as a function of the thickness d of a gold reflection layer.

The record carrier has the following structure: a substrate, gold reflection layer, a $Ta_2O_5$ interference layer having such a thickness that the reflection of the record carrier is maximal, and a 21 nm thick GeTe recording layer. The upper curve in the Figure, denoted by c, indicates the reflection of the record carrier with the recording layer in the crystalline state, while the lower curve, denoted by a, indicates the reflection with the recording layer in the amorphous state. For small thicknesses of the gold layer the reflection in the crystalline state increases, whereas it remains equal in the amorphous state. This results in an increase of the contrast. For a gold layer thickness of more than approximately 25 nm the reflection of the amorphous state also starts to increase, resulting in a higher reflection of the record carrier in both states and so in a smaller contrast. The decrease of the contrast is caused by the decreasing transmission of the reflection layer with an increasing thickness of this layer. Consequently, a smaller quantity of the incident radiation reaches the recording layer where the contrast is generated. If the use of the record carrier requires a high contrast, it is recommendable to maintain the transmission of the reflection layer at about 20%. This transmission is then measured with the reflection layer provided between a substrate and a thick interference layer. A high transmission of the reflection layer means that the metal layer must be thin. This has the further advantage that the thermal conductivity of the layer is not too large. With a low thermal conductivity the heat supplied to the recording layer is not dissipated too rapidly, so that the radiation beam requires less power to heat the recording layer sufficiently during writing, as is known, inter alia, from U.S. Pat. No. 4,984,231.

Figure 3:
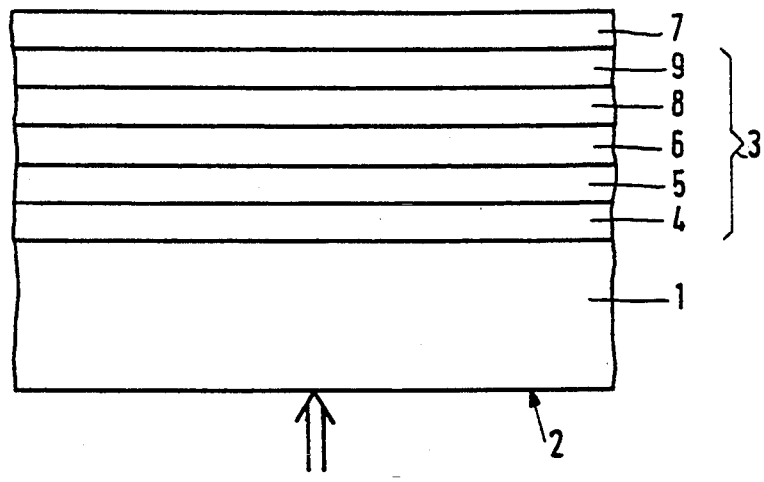
FIG. 3 shows a record carrier as in FIG. 1 but with an extra reflection layer and an extra interference layer.

A further increase of the contrast and the reflection of the record carrier can be achieved if the radiation passed by the recording layer is reflected again. Without this extra reflection the radiation which has been passed is lost. FIG. 3 shows a record carrier in which this is realized. Viewed from the substrate 1, the stack 3 comprises the reflection layer 4, the interference layer 5, the recording layer 6, a further interference layer 8 and a further reflection layer 9. The radiation enters the record carrier through the entrance face 2. The layers 8 and 9 reflect the radiation passed by the recording layer 6. In addition to the higher reflection, the addition of the two further layers also has the advantage that it provides a greater freedom of designing the stack so that also, for example, thermal properties of the stack can be optimized. The effect of the two additional layers on the reflection of the record carrier will be elucidated with reference to a second example in which a record carrier has a GeTe recording layer which is amorphous in the uninscribed state. Such a recording layer built in a stack as shown in FIG. 1 and optimized to obtain a high reflection in the amorphous state and a high contrast yields a record carrier reflection of 65% and 27% for the amorphous and the crystalline state, respectively. If the further interference layer 8 and reflection layer 9 are added, the following stack structure is obtained after optimization: 18 nm Au reflection layer 4, 150 nm $Ta_2O_5$ interference layer 5, 20 nm GeTe recording layer 6, 185 nm $Ta_2O_5$ interference layer 8 and 100 nm Au reflection layer 9. In the amorphous and crystalline states the reflection is 70% and 12%, respectively. In the example gold is used as a material for the further reflection layer due to the high reflection coefficient of this material. If such a satisfactorily conducting layer constitutes a too large thermal load for the recording layer, a metal alloy of low conductivity or a dielectric reflector can be used for the further reflection layer. The thermal load may alternatively be decreased by giving one or more interference layers a poor thermal conductivity by manufacturing the layers entirely or partly from an organic material.

Figure 4:
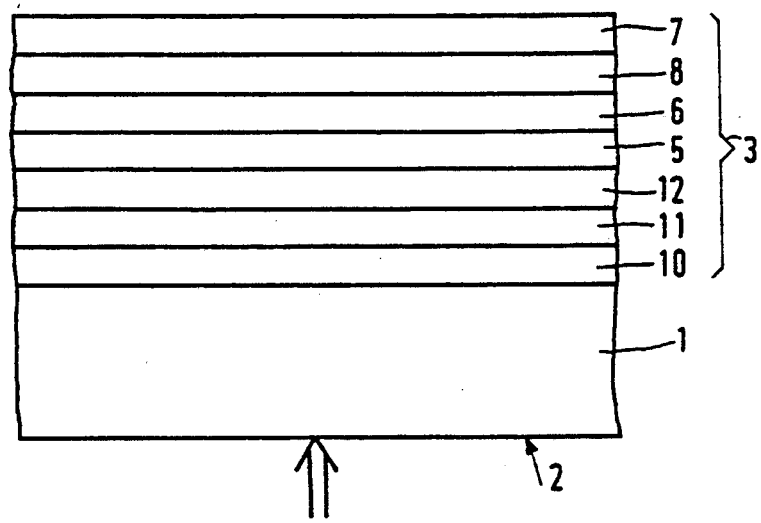
FIG. 4 shows a record carrier in accordance with the second embodiment of the first embodiment of the invention.

A record carrier of the second class according to the invention is shown in FIG. 4. In this record carrier the metal reflection layer 4 of FIG. 1 is replaced by a dielectric reflector comprising three dielectric layers denoted by 10, 11 and 12 in the Figure. The three dielectric layers each have an optical thickness of approximately a quarter of the wavelength of the radiation. The phase-change material GeTe can be used again for the recording layer 6. In a third example the stack 3 is optimized for high reflection in the amorphous state of GeTe and for maximal contrast. The stack then has the following structure: 95 nm $Ta_2O_5$ dielectric layer 10, 141 nm $SiO_2$ dielectric layer 11, 95 nm $Ta_2O_5$ dielectric layer 12, 50 nm $SiO_2$ interference layer 5, 20 nm GeTe recording layer 6 and 190 nm $Ta_2O_5$ dielectric layer 8. The protective coating 7 also functions as the further layer in this example. The dielectric layer 8 ensures the desired change of the refractive index at the transition between the layers 6 and 8 and the protective coating 7 is a protection against overheating when the recording layer 6 is being inscribed. The reflection of the record carrier is 67% for the amorphous state and 28% for the crystalline state as measured for the record carrier. The dielectric reflector has a smaller coefficient of thermal conductivity than the metal reflector so that less power is required to inscribe the recording layer 6. If the dielectric reflector comprises three layers, the same reflection and contrast can be achieved as that for the record carrier with the metal reflector 4 shown in FIG. 1.

When an injection-molded plastic substrate 1 is used, information in the form of, for example pits or tracks for tracking the radiation beam may be provided in the substrate on the side of the stack. If the substrate is made of glass, it is simpler to provide this information in a lacquer layer between the substrate and the stack. Such a lacquer layer will have approximately the same refractive index as the substrate so that the stack need not be essentially adapted because of the presence of the lacquer layer. It will be evident that the lacquer layer does not form part of the stack, even if the stack has a dielectric reflector, because the lacquer layer always has a low refractive index and the first layer of the dielectric reflector always has a high refractive index.

Figure 6:
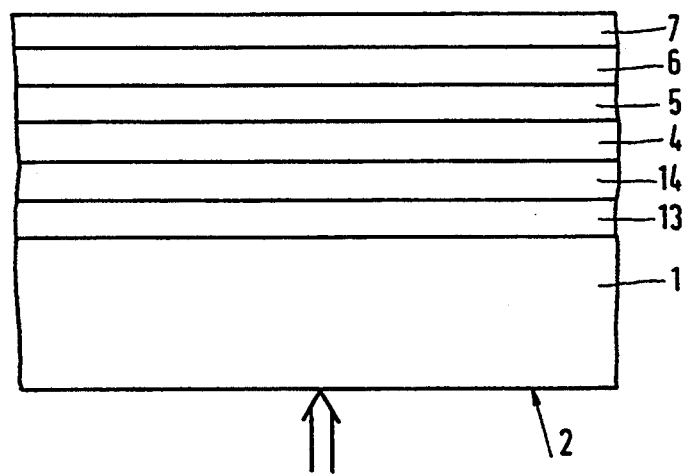
FIG. 6 shows a record carrier as in FIG. 1 but provided with a base layer.

The growing of a thin metal layer on a substrate does not always lead to a layer with a uniform thickness, because many metals, amongst which gold, have a tendency to form small islands at the start of the growing process. The non-uniformity of the thickness is particularly large for thin metal layers grown on said lacquer layer. This tendency can be suppressed by growing the metal layer on a base layer made of a dielectric, inorganic material. The material is preferably an oxide, nitride or sulfide, e.g. $Ta_2O_5$, AlN, $SiO_2$ or ZnS. FIG. 6 shows an embodiment of the record carrier provided with a base layer. The substrate 1 has a lacquer layer 13 in which the tracking information is embossed. The stack on top of the lacquer layer contains a base layer 14, a metal reflection layer 4, an interference layer 5, a recording layer 6 and a protective coating 7. The base layer can also be used in record carriers without a lacquer layer. Further advantages of the base layer are that it can be used to obtain a specific reflection of the record carrier by choosing appropriate values for the refractive index and thickness of the base layer, and that it protects the metal reflection layer from degradation caused by contaminants diffusing out of the substrate by sealing the metal with an inert layer.

Figure 5:
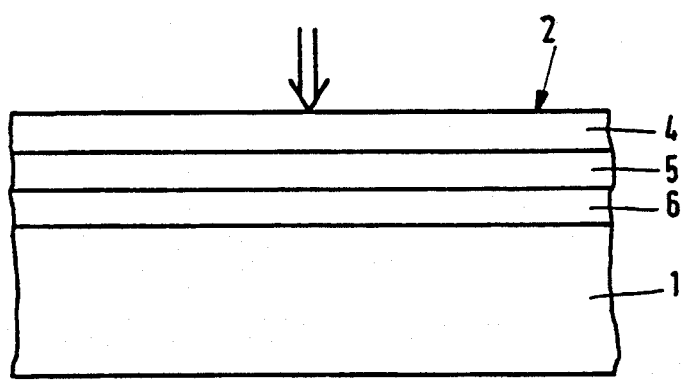
FIG. 5 shows a record carrier according to the invention.

In the above-mentioned examples the entrance face 2 for the radiation is present on a different side of the substrate 1 than the stack 3. It is of course alternatively possible for the radiation not to pass the substrate first but to cause it to be directly incident on the stack. The entrance face 2 of such a record carrier, shown in FIG. 5, will then be the upper side of the reflection layer 4. The order of the layers in the stack relative to the substrate is reversed as compared with that of the record carrier shown in FIGS. 1, 3 and 4.

The entrance face 2 reflects a part of the incident radiation as well as a part of the exciting radiation. When a substrate of glass or plastic is used, approximately 8% of the radiation in the focused radiation beam is lost. An anti-reflection coating on the entrance face reduces the losses to less than 1%. Consequently, more radiation is available for inscribing and more radiation is returned during reading. As a result, the stack 3 in a record carrier having an anti-reflection coating may have a lower reflection than in a record carrier without an anti-reflection coating if the same reflection requirement for the record carrier is to be met. If the record carrier according to FIG. 4, comprising a recording layer of GeTe, is provided with an anti-reflection coating, the reflection of the record carrier meets the requirements for the CD.

In the examples described the different dielectric layers are made of $Ta_2O_5$. Said advantages of these layers can be achieved in all optical record carriers, particularly those requiring heat for inscribing the recording layer.

Although GeTe is used as phase-change material in the examples shown, it will be evident that alloys of GeTe with, for example, Sb or other phase-change materials such as alloys with In, Sb, Se, Sn and/or Ga can be used in the record carrier according to the invention. In principle, the invention may be used in any record carrier comprising a recording material whose refractive index changes upon inscribing. These materials may be once-inscribable materials such as dyes or metal alloys and re-inscribable materials. The invention may also be used in magneto-optical record carriers comprising a recording layer of a magnetic material which is written and read by means of a radiation beam.

What is claimed is:

1. An optical record carrier for writing and reading information by means of a radiation beam incident on an entrance face of the record carrier, comprising a substrate carrying a stack of layers, which stack comprises a recording layer, a transparent interference layer and a reflection layer, in that order; characterized in that the reflection layer of the stack faces the entrance face, and the reflection layer comprises a metal or a metal alloy.

2. An optical record carrier as claimed in claim 1, characterized in that the transmission coefficient of the reflection layer is larger than 0.2.

3. An optical record carrier as claimed in claim 1, characterized in that the stack contains a base layer adjacent to the reflection layer on the side thereof which faces the entrance surface, and the base layer is made of a dielectric inorganic material.

4. An optical record carrier as claimed in claim 3, characterized in that a further interference layer and a further reflection layer are provided on the side of the recording layer opposite that which faces the first-named interference layer.

5. An optical record carrier as claimed in claim 3, characterized in that the recording layer comprises a phase-change material.

6. An optical record carrier as claimed in claim 5, characterized in that the phase-change material comprises an alloy of germanium (Ge) and tellurium (Te).

7. An optical record carrier as claimed in claim 1, characterized in that a further interference layer and a further reflection layer are provided on the side of the recording layer opposite that which faces the first-named interference layer.

8. An optical record carrier as claimed in claim 7, characterized in that the further reflection layer comprises a metal or a metal alloy.

9. An optical record carrier as claimed in claim 7, characterized in that at least one interference layer comprises tantalum oxide ($Ta_2O_5$).

10. An optical record carrier as claimed in claim 1, characterized in that the recording layer comprises a phase-change material.

11. An optical record carrier as claimed in claim 10, characterized in that the phase-change material comprises an alloy of germanium (Ge) and tellurium (Te).

12. An optical record carrier as claimed in claim 1, characterized in that an anti-reflection coating is provided on the entrance face.

13. An optical record carrier for writing and reading information by means of a radiation beam incident on an entrance face of the record carrier, comprising a substrate carrying a stack of layers, which stack comprises a recording layer, an interference layer and a reflection layer, in that order; characterized in that the reflection layer of the stack faces the entrance face, and the reflection layer comprises at least three dielectric layers.

14. An optical record carrier as claimed in claim 13, characterized in that a further interference layer and a further reflection layer are provided on the side of the recording layer opposite that which faces the first named interference layer.

15. An optical record carrier as claimed in claim 14, characterized in that at least one interference layer comprises tantalum oxide ($Ta_2O_5$).

16. An optical record carrier as claimed in claim 13, characterized in that the recording layer comprises a phase-change material.

17. An optical record carrier as claimed in claim 16, characterized in that the phase-change material comprises an alloy of germanium (Ge) and tellurium (Te).

* * * * *